(12) United States Patent
Brandin et al.

(10) Patent No.: US 7,469,870 B2
(45) Date of Patent: Dec. 30, 2008

(54) HOLDING DEVICE FOR A LIQUID CONTAINER

(75) Inventors: Marko Brandin, Renningen (DE); Thorsten Schmolla, Stuttgart (DE); Reinhard Schweins, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/555,412

(22) PCT Filed: Apr. 29, 2004

(86) PCT No.: PCT/EP2004/004542

§ 371 (c)(1),
(2), (4) Date: Aug. 10, 2006

(87) PCT Pub. No.: WO2004/098948

PCT Pub. Date: Nov. 18, 2004

(65) Prior Publication Data

US 2007/0090141 A1    Apr. 26, 2007

(30) Foreign Application Priority Data

May 3, 2003    (DE) ............................... 103 19 853

(51) Int. Cl.
*A47K 1/08* (2006.01)

(52) U.S. Cl. ..................... 248/311.2; 224/277; 224/926

(58) Field of Classification Search .............. 248/311.2; 220/345.2, 345.4; 224/277, 540, 544, 926; 296/24.34, 37.1, 37.8

See application file for complete search history.

(56) References Cited

U.S. PATENT DOCUMENTS

| 5,152,489 A | * | 10/1992 | Christensen et al. ...... 248/311.2 |
| 6,206,260 B1 | * | 3/2001 | Covell et al. ................ 224/539 |
| 2002/0121533 A1 | | 9/2002 | Plate |

FOREIGN PATENT DOCUMENTS

| DE | 197 39 134 C1 | | 4/1999 |
| DE | 199 01 073 A1 | | 7/2000 |
| DE | 10316817 A1 | * | 10/2004 |
| GB | 2321388 A | * | 7/1998 |
| JP | 06320997 A | | 11/1994 |

OTHER PUBLICATIONS

International Search Report dated Oct. 27, 2004 Seven (7) Pages.

* cited by examiner

*Primary Examiner*—Korie H. Chan
(74) *Attorney, Agent, or Firm*—Crowell & Moring LLP

(57) ABSTRACT

A holding device for liquid containers has at least one molding for receiving the liquid container, and a removable part that is releaseably connected to the holding device. The removable part comprises at least one tool (for example a bottle opener) or a slot which is suitable for receiving a card. The liquid container is held by moldings and sections. Fastening means are used to fix the holding device in the central console.

5 Claims, 3 Drawing Sheets ically preferred embodiment of the invention, the
HOLDING DEVICE FOR A LIQUID CONTAINER

BACKGROUND AND SUMMARY OF THE INVENTION

This application claims the priority of German patent document 103 19 853.9, filed May 3, 2003 (PCT International Application No. PCT/EP2004/004542, filed Apr. 29, 2004), the disclosure of which is expressly incorporated by reference herein.

The present invention is directed to a holding device for liquid containers.

Such holding devices are generally known and are arranged for example in a central console in the vehicle cabin. The holding device serves to receive drinks bottles, cups or cans. For example, German patent document DE 198 02 897 A1 discloses such a holding device which consists of a combination of a central console, forming a receiving part with a depression for introducing cans, and a clamping insert which can be removably fitted in the depression of the central console. Further technical background is also provided in Japanese patent documents JP 09030310 A and JP 06320997 A.

One object of the invention is to provide a holding device which is simple, cost-effective and compact.

Another object of the invention is to provide such a holding device which has an insert that combines various functions.

These and other objects and advantages are achieved by the holding device for liquid containers according to the invention, (particularly for use in a vehicle cabin), which includes moldings for receiving liquid containers. A removable part of the holding device which is arranged between at least two adjacent moldings is releaseably connected to the holding device, and includes at least one functional means. The removable part is designed as an insert in the holding device, and the functional means may comprise a chip card holder (for example for a chip card or a magnetic card) and a tool, thereby making optimal use of the space between the moldings. The functional means may be selected to suit the requirements of the user.

The card holder may be designed as a slot or depression in the insert, which may take different forms so as to improve the receiving properties for various objects. A narrow depression whose length is tailored to the card to be received is advantageous for receiving magnetic cards, chip cards or car park tickets. The card is thus held upright, making it easy to grip. In order for CDs to be received in an upright position, the depression may have the shape of a shallow prism with a base formed as a segment of a circle. However, the depression may also be made wider to make it possible for example to receive music cassettes.

As an alternative, the holder may comprise clips which project from the insert and enable the flat object to be gripped at its side faces. These clips may likewise be tailored to the object to be received.

Apart from a slot, depression or a clip, other types of holding means, such as magnets, Velcro-type fasteners etc., are also possible.

In a further refinement of the invention, the removable insert, in the installed position, has its end faces bearing flush against the holding device, which provides various advantages. In particular, the resulting fit favors insertion on the one hand, and allows better holding of the part in the installed position on the other hand. Moreover, an esthetic design is achieved.

In a further embodiment, the section directed toward the liquid container adjoins the end faces and supplements the molding to form a closed contour. An advantage of this embodiment is that the liquid containers to be held can be supported over their entire periphery.

In a particularly preferred embodiment of the invention, the contour formed by the section and the molding is substantially annular. This shape ensures that the liquid containers, which are at least partially conical or cylindrical (for example glasses, cups, cans or bottles), are held around their periphery. However, the section may also be designed to receive other container shapes, in order to provide an improved grip for drinks cartons or pouches, for example.

In a further embodiment of the invention, the tool may be an opener for screw tops, an opener for crown caps or a corkscrew, which arranged on the underside of the insert. The corkscrew may be designed in such a way that it can be folded out in the manner of a penknife, and advantageously the insert serves simultaneously as a handle for the tools.

In a further embodiment of the invention, the part comprises a combination of the functional means, and advantageously can perform various functions (for example bottle opener, card holder).

In a further refinement of the invention, the part is connected to the holding device or a plug-in connection, by means of a clip connection, and/or magnetically. Such connections may be present individually or in various combinations. Thus, for example, one end face may be provided with a pin which simultaneously serves as a guide pin and is advantageous when inserting the part. However, the end face may also comprise clip connections such as latching hooks, for example. The magnetic connection may be configured in such a way that some or all of the end face consists of a magnetic material and bears against the molding, which is correspondingly configured with the magnetic material in this region. In this case, it is advantageous that no wear results, and that the connection is not damaged by inadvertent mishandling.

Other objects, advantages and novel features of the present invention will become apparent from the following detailed description of the invention when considered in conjunction with the accompanying drawings.

DETAILED DESCRIPTION OF THE DRAWINGS

Figure 1:
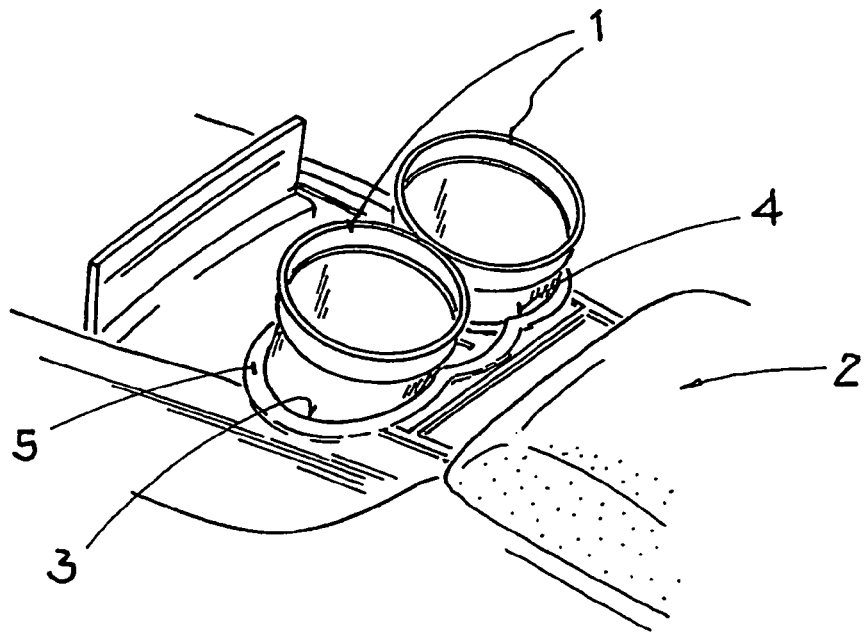
FIG. 1 is a perspective representation showing a detail of a motor vehicle central console equipped with a cup holder.

FIG. 1 is a perspective view of a portion of a motor vehicle central console 2 equipped with a holding device 5, which has two moldings 3, 4 in which respective cups 1 are situated. The moldings 3, 4 are arranged next to one another transversely to the longitudinal direction of the central console 2.

Figure 2:
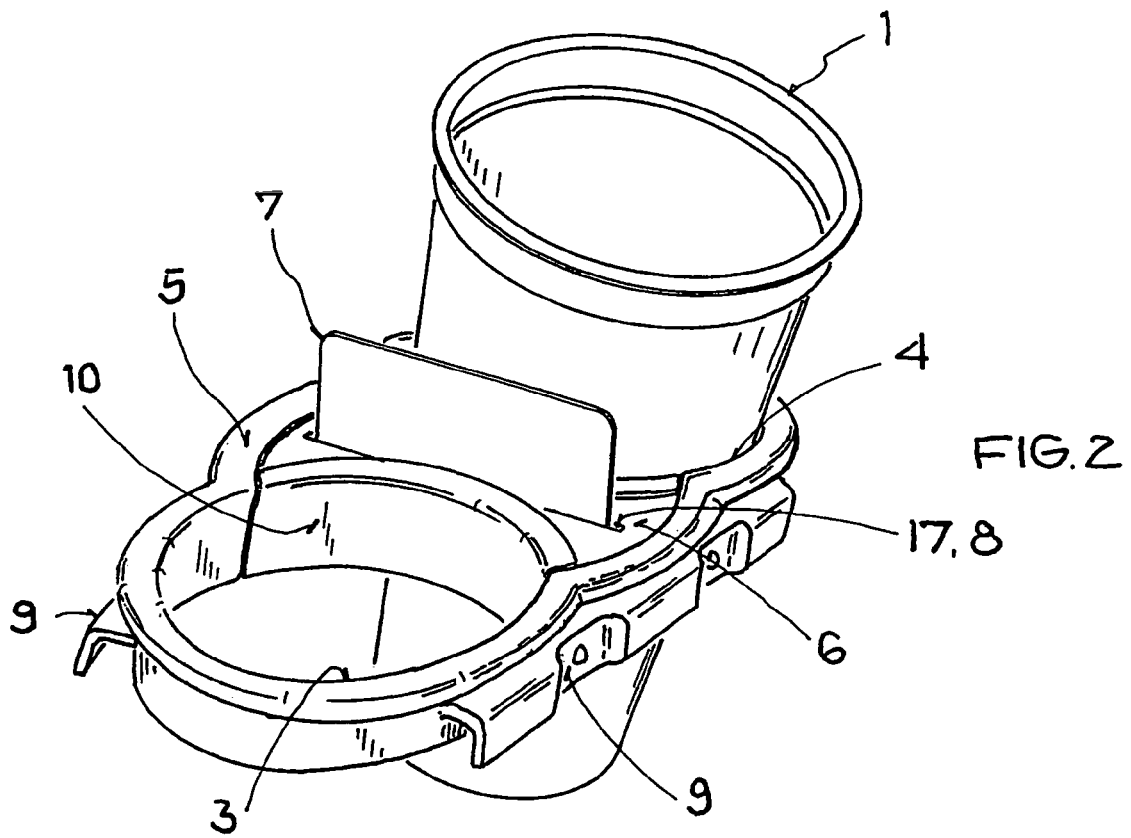
FIG. 2 shows a holding device with a removable insert according to the invention.

FIG. 2 shows an embodiment of a removable insert part 6 according to the invention, in the inserted state in the holding device 5. A card 7 is inserted in a holder 17, which is designed as a slot 8. A section 10 of the part 6 adjoins the molding 3 and forms a ring therewith. The right-hand molding 4 holds a cup 1 around its entire circumference.

The holding device 5 is provided with fastening means 9 so that it can be installed in the central console 2.

Figure 3:
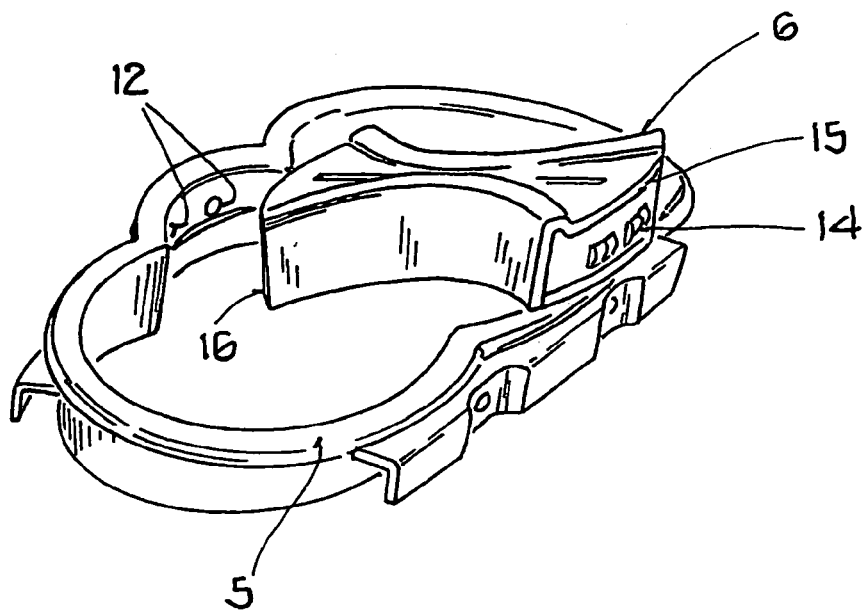
FIG. 3 is a perspective view of the holding device for two liquid containers and the removable insert.

FIG. 3 is a perspective representation showing the holding device 5 and the part 6. The holding device 5 contains holes 12 which receive pins 13 (FIG. 4) of the part 6 in the installed state. The shape of end faces 15, 16 (FIG. 4) conforms to the shape to the holding device 5. In FIG. 3, the part 6 is shown in a position shortly after removal or shortly before insertion. During insertion, the pins 13 are first placed against the holes 12, and then a clip connection 14 is latched into the holding device 5 by pressing down the part 6 at the opposite end. Removal is carried out in the reverse order.

Figure 4:
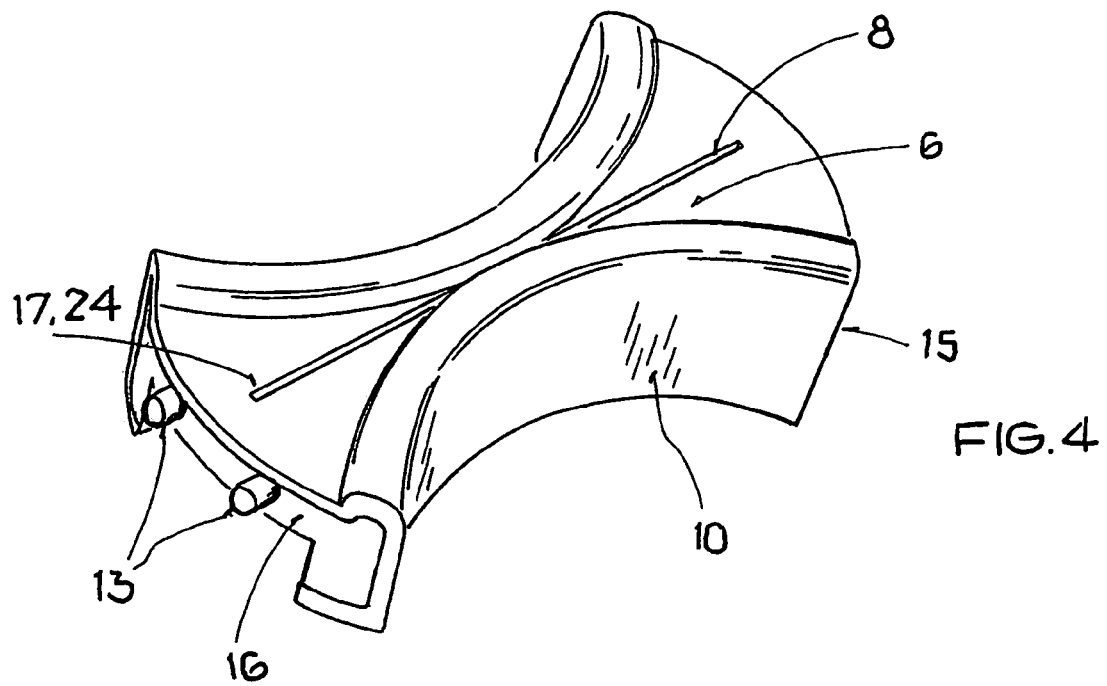
FIG. 4 is a perspective view of the removable insert, from above.

FIG. 4 shows the part 6 in a perspective view obliquely from above. The slot 8 for receiving the card 7 is situated in the center of the part 6. The pins 13, which are situated on the end face 16, produce the plug-in connection with the holding device 5 by way of the holes 12, and are arranged above an opener 18 (FIG. 5).

Figure 5:
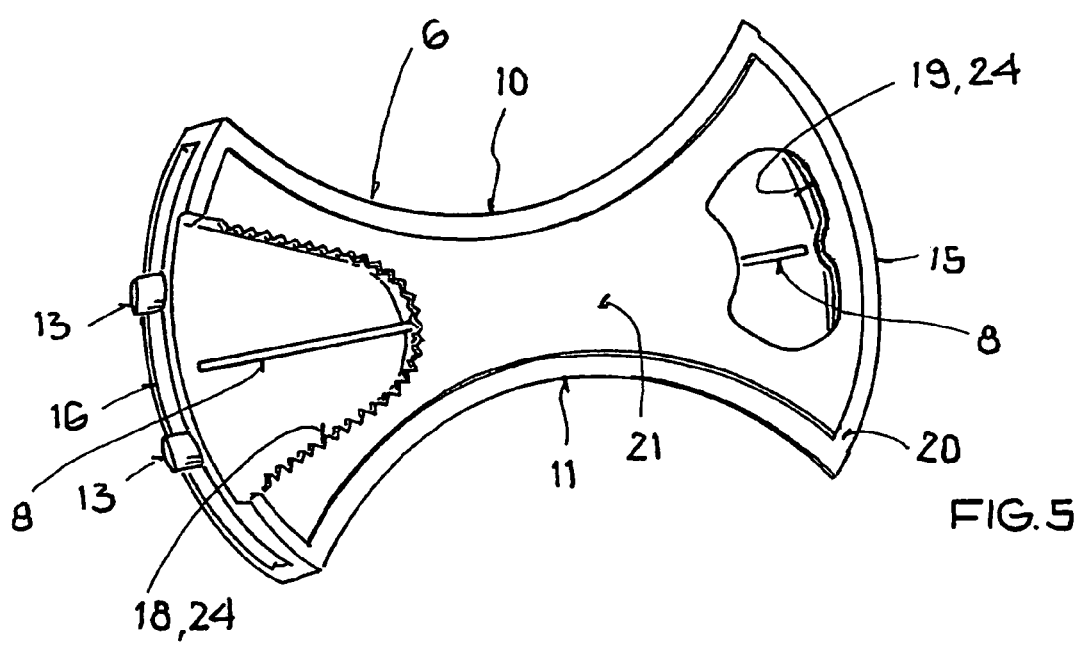
FIG. 5 is a bottom view of the removable insert.

FIG. 5 is a bottom view of the removable part 6. The opener 18 for screw tops and an opener 19 for crown caps are arranged opposite one another. The opener 18 is provided with a serrated profile, and has an opening that tapers from the end face 16 toward the center of the part 6. The opener 18 enables screw tops of different diameters to be gripped. As noted previously, sections 10, 11 have a shape that corresponds to an outer contour of the cup 1.

The part 6 consists of a one-piece housing 20 and a bottom part 21. The housing 20 comprises the pins 13, the slot 8, the sections 10, 11 and the end faces 15, 16. The bottom part 21 comprises the openers 18, 19 and is produced for example from metal or a hard plastic and is firmly connected to the housing.

The card 7 is held by being pushed through the slot 8 into the housing. The bottom part 21 here serves as a stop and prevents the card 7 from slipping through.

Figure 6:
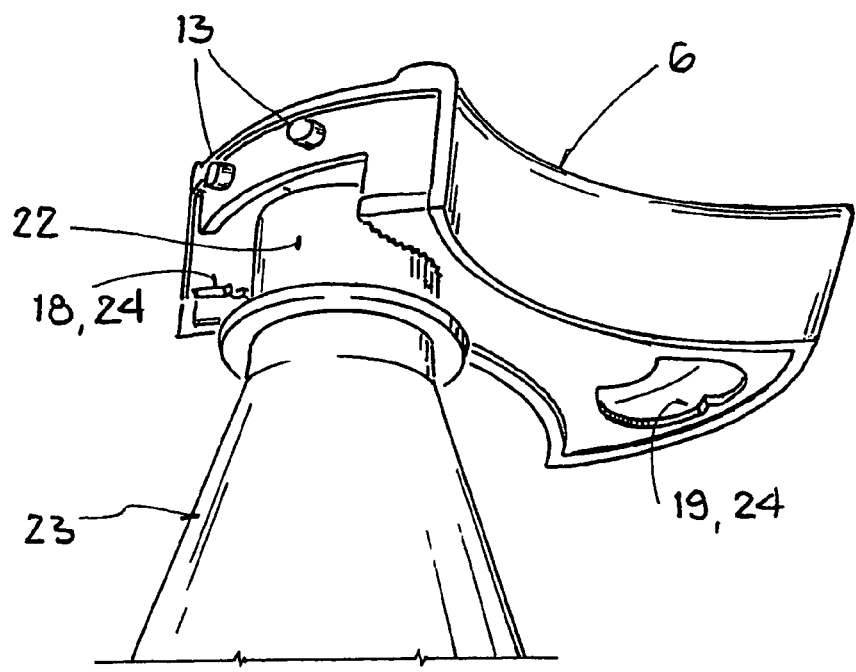
FIG. 6 shows the removable insert in the use position when opening a screw top of a bottle.

FIG. 6 shows the part 6 and a screw top 22 of a bottle 23. The part 6 is applied to the screw top of the bottle 23 and simultaneously forms a handle and lever for the opener 18.

The part 6 may also comprise a fold-out corkscrew. The axis about which the corkscrew can be folded out is arranged in such a way that, in the folded-out state, the corkscrew projects centrally from the bottom part 21. In the folded-in state the corkscrew is set back within the part 6.

Furthermore, the bottom part 21 may be interchangeable, thereby making various combinations of functional means 24 possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A holding device for liquid containers, comprising: at least two moldings for receiving at least one liquid container; and a removable part arranged between at least two adjacent moldings in an installed position; wherein, the removable part is releaseably connected to, and removable from, the holding device; the removable part, wherein in the installed position, comprises at least an aperture formed within a continuous portion of the removable part and at least one tool; and the removable cart is designed as an insert to the holding device and is arranged to hold a card in the aperture when the removable part is in the installed position, the insert has end faces that bear against the holding device and comprises a section directed toward the at least one liquid container to be received and the section directed toward the at least one liquid container adjoins the end faces and supplements the molding to form a closed inner contour, wherein the closed inner contour is substantially annular.

2. The holding device as claimed in claim 1, wherein the tool comprises at least one of an opener for screw tops, an opener for crown caps and a corkscrew.

3. The holding device as claimed in claim 2, wherein the part comprises two tools.

4. The holding device as claimed in claim 3, wherein the part comprises at least three functional means.

5. The holding device as claimed in claim 4, wherein the part is connected to the holding device by one of a plug-in connection, a clip connection and a connection.

* * * * *